United States Patent
Laberer et al.

(10) Patent No.: US 7,372,220 B2
(45) Date of Patent: May 13, 2008

(54) EXTRUSION PLANT WITH SYNCHRONIZED DRIVE UNITS, AND METHOD OF SYNCHRONIZATION OF DRIVE UNITS

(75) Inventors: Roman Laberer, Oberroth (DE); Stefan Baumer, Freising (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 317 days.

(21) Appl. No.: 11/268,237

(22) Filed: Nov. 7, 2005

(65) Prior Publication Data
US 2006/0053795 A1    Mar. 16, 2006

Related U.S. Application Data

(63) Continuation of application No. PCT/EP2004/003929, filed on Apr. 14, 2004.

(30) Foreign Application Priority Data
Mar. 7, 2003  (DE) ............... 103 20 179
Jun. 18, 2003 (DE) ............... 103 27 397

(51) Int. Cl.
*H02P 5/46* (2006.01)

(52) U.S. Cl. ............... 318/77; 318/74; 318/85; 264/40.1; 700/72

(58) Field of Classification Search ............ 318/40–85; 264/40.1; 700/72
See application file for complete search history.

(56) References Cited

U.S. PATENT DOCUMENTS

| | | | | |
|---|---|---|---|---|
| 2,794,507 | A * | 6/1957 | Banning, Jr. ................. | 416/27 |
| 4,723,980 | A * | 2/1988 | Sidler et al. .................. | 65/163 |
| 5,037,252 | A * | 8/1991 | Hasegawa et al. ............. | 409/2 |
| 7,166,246 | B2 * | 1/2007 | Oka et al. ................. | 264/40.1 |
| 7,245,975 | B2 * | 7/2007 | Mirza ......................... | 700/72 |
| 2004/0140579 | A1 * | 7/2004 | Uwaji et al. ............... | 264/40.1 |
| 2006/0241789 | A1 * | 10/2006 | Mirza ......................... | 700/61 |

FOREIGN PATENT DOCUMENTS

| | | |
|---|---|---|
| DE | 196 51 427 | 6/1998 |
| DE | 198 59 348 | 7/2000 |

* cited by examiner

*Primary Examiner*—Paul Ip
(74) *Attorney, Agent, or Firm*—Henry M. Feiereisen; Ursula B. Day

(57) ABSTRACT

In a method for synchronizing drive units, a target value of the speed of each drive unit of a plurality of drive units speed is computed by determining the product of a maximum speed of the drive unit, a unit-dependent normalized ratio value of the drive unit, and a synchronization factor which is identical for all drive units. The ratio value defines the relative speeds of the individual drive units. Changing the synchronization factor causes synchronous speed changes of the drive units. As a result, a lasting synchronization can be realized across the entire speed spectrum.

10 Claims, 2 Drawing Sheets

EXTRUSION PLANT WITH SYNCHRONIZED DRIVE UNITS, AND METHOD OF SYNCHRONIZATION OF DRIVE UNITS

CROSS-REFERENCES TO RELATED APPLICATIONS

This application is a continuation of prior filed copending PCT International application no. PCT/EP2004/003929, filed Apr. 14, 2004, which designated the United States and on which priority is claimed under 35 U.S.C. §120, and which claims the priority of German Patent Applications, Serial Nos. 103 20 179.3, filed May 7, 2003, and 103 27 397.2, filed Jun. 18, 2003, pursuant to 35 U.S.C. 119(a)-(d), the subject matter of which is/are incorporated herein by reference.

BACKGROUND OF THE INVENTION

The present invention relates, in general, to an extrusion plant of a type having several drive units, and to a method of synchronizing the speeds of the drive units.

Nothing in the following discussion of the state of the art is to be construed as an admission of prior art.

Extrusion plants are typically used for extruding thermoplastic material. A thermoplastic starting material in the form of pellets or powder is hereby fed by a metering unit into a conveying screw which homogenizes and thermally plasticizes the material. Plasticized material is pressed through a shaping die, producing a strand which is drawn from a take-off unit through cooling units. Extrusion plants of this type are applicable for producing profiled bars, tubes, plates and the like. The extrusion plant which may be comprised of several extruder units has drive units that are normally centrally controlled and may involve plasticizing screw, metering unit, and take-off unit, for example.

In order to provide a reproducible product quality, any change in speed of the extrusion plant requires a synchronous adjustment of the speeds of all drive units. One synchronization approach involves a ratio-based translation of the speed change of a drive unit to the other drive units. This is problematic when the speed is adjusted frequently because inaccuracies of the numerical computation result in a divergence of the drive speeds. Another synchronization approach allows synchronization only when a minimum speed has been reached because otherwise the coupling factors between the individual drive units cannot be calculated accurately enough. Synchronization is thus ineffective, when the speed drops below the minimum speed, so that synchronization must be executed by hand.

It would therefore be desirable and advantageous to provide an improved method of synchronizing drive units and to provide an improved extrusion plant with synchronized drive unit, to obviate prior art shortcomings and to attain a continuous and lasting synchronization across the entire speed range.

SUMMARY OF THE INVENTION

According to one aspect of the present invention, a method for synchronizing drive units includes the steps of calculating a target value of the speed of each drive unit for a plurality of drive units by determining a product of a maximum speed of the drive unit, a ratio value for the drive unit, and a synchronization factor which is identical for all drive units, modifying the synchronization factor so as to implement synchronous speed changes for the drive units, and modifying ratio values to implement changes in speed ratios between the drive units.

The present invention resolves prior art problems by ascertaining the desired speed value of a drive unit from the product of maximum speed of the drive unit, a drive unit dependent normalized ratio, and a synchronization factor which is identical for all drive units, in accordance with the following equation:

$$\text{Target value} = \text{Synchronization Factor} \cdot \text{Ratio Value} \cdot \text{Maximum Speed}$$

The ratio value defines the relative speeds of the individual drive units with respect to one another. When synchronous speed changes occur, the synchronization factor is changed, whereas the ratio values remain the same so that the speed of the drive units from standstill up to a maximum speed can be adjusted, when the synchronization factor changes from 0 to the maximum value. The speed ratios between the individual drive units can be changed by adjusting one or more ratio values. Synchronization is possible at each operating point.

According to another feature of the present invention, a highest ratio value among the ratio values of all drive units can be normalized to a maximum value which cannot be exceeded.

According to another feature of the present invention, following a change of a target value, an output value with a predefined change in speed can be generated until the changed target value has been reached.

According to another feature of the present invention, the predefined change in speed at synchronous changes in speed can be determined on the basis of a slowest maximum speed change for all drive units.

According to another feature of the present invention, the predefined speed change, when changing the target value of a single drive unit, can be determined on the basis of a maximum speed change of said drive unit.

According to another feature of the present invention, an extrusion plant includes plural drive units, each operating at a desired speed value which is calculated by determining a product through multiplication of a maximum speed of the drive unit, a ratio value and a synchronization factor which is identical for all drive units, wherein the drive units are constructed such that a modification of the synchronization factor causes synchronous speed changes of the drive units, and a modification of the ratio values causes changes in speed ratios between the drive units.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
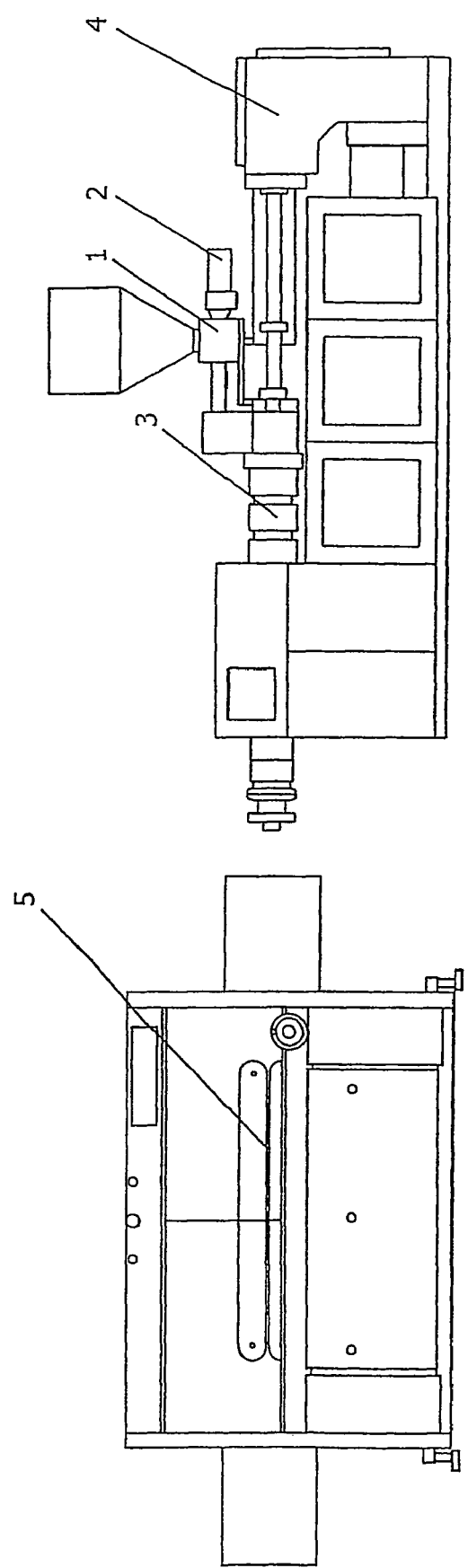
FIG. 1 is a schematic illustration of an extrusion plant having incorporated therein the subject matter according to the present invention.

Throughout all the Figures, same or corresponding elements are generally indicated by same reference numerals.

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an extrusion plant having incorporated therein subject matter according to the present invention and including a metering unit 1, a drive unit 2 for the metering unit 1, an extruder screw 3, a drive unit 4 for the extruder screw 3, a take-off unit 4, and an unillustrated drive unit for the take-off unit 5. The mode of operation of these components of the extrusion plant is generally known to the skilled artisan so that de detailed discussion is omitted for the sake of simplicity.

Figure 2:
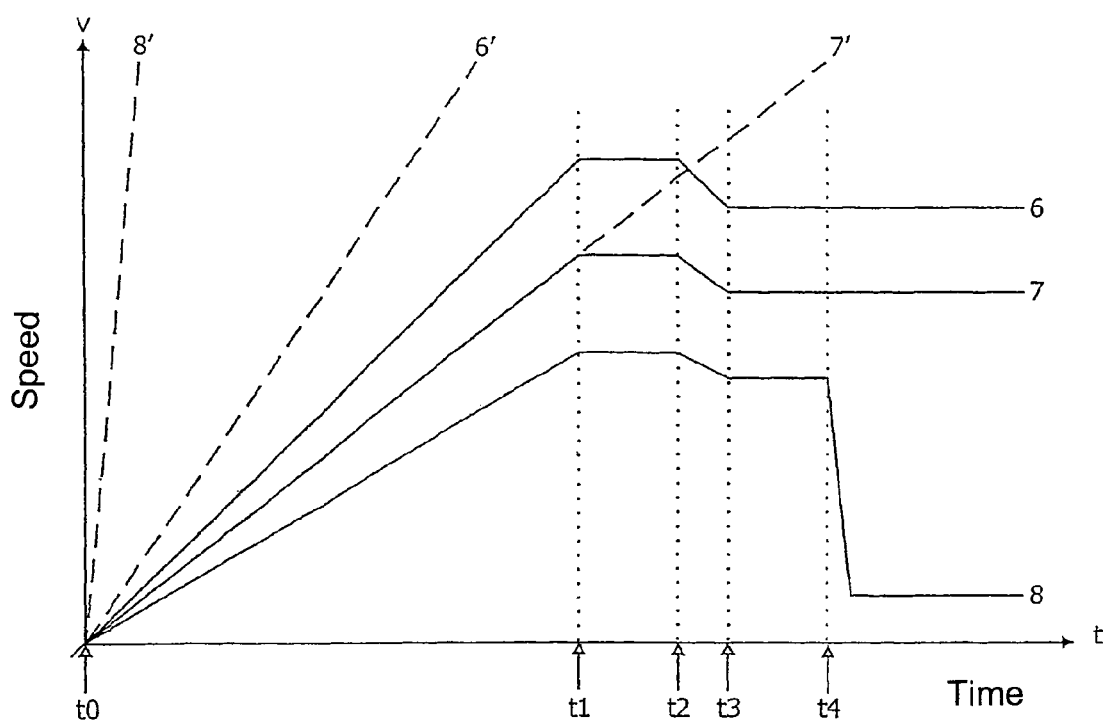
FIG. 2 is a graphical illustration of a v-t diagram, showing the speed of drive units of the extrusion plant as a function of the time.

FIG. 2 is a graphical illustration of a v-t diagram, showing the speed of the drive units of the extrusion plant as a function of the time. Curve 6 represents hereby the speed of the metering unit 1, curve 7 represents the speed of the extruder screw 3, and curve 8 represents the speed of the take-off unit 5. The extrusion plant commences operation at a point in time t0. At this time instance, the synchronization factor is set to 0 so that the speed of all drive units is 0. The desired target values of the speed of all drive units are the values present in the time interval from point in time t1 to point in time t2. To reach these intended speeds, the output values of the individual drive units are steadily increased in the time interval from production start t0 until the desired target values are reached at point in time t1. The synchronization factor is hereby increased steadily from 0 until the desired target value is reached. As the drive units normally permit different maximum speed changes, as shown in FIG. 2 by way of straight dashed lines 6' for the metering unit 1, 7' for the extruder screw 3, and 8' for the take-off unit 5, the change in speed is based on the maximum change in speed of the slowest drive unit, here the extruder screw 3.

At point in time t1, the desired target speed has been reached and is maintained until point in time t2. At point in time t2, the synchronized speed is adjusted, whereupon the speeds of the drive units is lowered in synchronism in the time interval from point in time t2 to point in time t3 until the desired target values have been reached at point in time t3. Also in this case, the speed change depends on the maximum speed change of the slowest drive unit, i.e. the extruder screw 3. The speeds are again kept constant in the time interval from point in time t3 to point in time t4. At point in time t4, the speed of drive unit for the take-off 5 is adjusted non-synchronously by reducing the take-off speed until reaching the new target value, while the speeds of the metering unit 1 and the extruder screw 3 are maintained constant.

This non-synchronous speed adjustment is realized by decreasing the ratio value of the drive unit for the take-off 5. In this case, the speed change of the output value until reaching the new target value is determined by the maximum change in speed of the individual drive unit, here the drive unit for the take-off 5.

The highest ratio value is normalized to a maximum value which may not be exceeded so that all other drive units receive a lower ratio value. In this way, maximum computation accuracy is attained and an overrun of the maximum ratio value is prevented. The drive unit having the highest ratio value is designated as master drive unit. When setting the synchronization factor to the maximum value, the master drive unit operates at maximum speed, while the other drive units with lower ratio values operate below their maximum speeds. The following normalized formula governs:

$$\text{Target Value} = \frac{\text{Synchronization-Factor}}{\text{Maximum-Synchronization-Factor}} \cdot \frac{\text{Ratio-Value}}{\text{Maximum-Ratio-Value}} \cdot \text{Maximum Speed}$$

To effect a synchronous change in speed, an operator provides a new target value for a drive unit. Based on the new target value, a new synchronization factor is computed which is applicable to all drive units. As a consequence, new target values are provided for all drive units. When changing the speed individually in a non-synchronous manner, the desired new target value is used for computing a new ratio value, while all other values remain constant.

To implement the synchronization method according to the invention in practice, conventional sensors for speeds, etc. and a programmable control and operating unit can be used. Of course, the synchronization method according to the present invention is equally applicable to plants having different or additional units.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for synchronizing drive units, comprising the steps of:
   computing the target value of the speed of each drive unit for a plurality of drive units by determining the product of a maximum speed of the drive unit, a ratio value of the drive unit, and a synchronization factor which is identical for all drive units;
   modifying the synchronization factor so as to implement synchronous speed changes for the drive units; and
   modifying ratio values to realize changes in speed ratios between the drive units.

2. The method of claim 1, further comprising the step of normalizing a highest ratio value among the ratio values of all drive units to a maximum value which cannot be exceeded.

3. The method of claim 1, further comprising the step of tracing an output value with a predefined change in speed, when a target value is changed, until the changed target value has been reached.

4. The method of claim 3, further comprising the step of determining the predefined change in speed at synchronous changes in speed on the basis of a slowest maximum speed change of all drive units.

5. The method of claim 3, further comprising the step of determining the predefined speed change, when changing the target value of a single drive unit, on the basis of a maximum speed change of said drive unit.

6. An extrusion plant, comprising plural drive units, each operating at a desired speed value which is calculated by determining a product through multiplication of a maximum speed of the drive unit, a ratio value and a synchronization factor which is identical for all drive units, wherein the drive units are constructed such that a modification of the synchronization factor causes synchronous speed changes of the drive units, and a modification of the ratio values causes changes in speed ratios between the drive units.

7. The extrusion plant of claim 6, wherein a greatest ratio value of all drive units is normalized to a maximum value which cannot be exceeded.

8. The extrusion plant of claim 6, wherein a change of a target value generates an output value with predefined speed change until the changed target value has been reached.

9. The extrusion plant of claim 8, wherein the predefined speed change at synchronous speed changes are determined on the basis of a slowest maximum speed change of all drive units.

10. The extrusion plant of claim 8, wherein the predefined speed change, when changing the target value of a single drive unit, is determined on the basis of a maximum speed change of said drive unit.

* * * * *

UNITED STATES PATENT AND TRADEMARK OFFICE
CERTIFICATE OF CORRECTION

PATENT NO. : 7,372,220 B2  Page 1 of 1
APPLICATION NO. : 11/268237
DATED : May 13, 2008
INVENTOR(S) : Roman Laberer and Stefan Baumer It is certified that error appears in the above-identified patent and that said Letters Patent is hereby corrected as shown below:

On the title page, item [30] Foreign Application Priority Data

First line: replace "March 7, 2003" with --May 7, 2003--.

Signed and Sealed this

Twenty-sixth Day of August, 2008

JON W. DUDAS
*Director of the United States Patent and Trademark Office*